US011875765B2

(12) United States Patent
Utsumi et al.

(10) Patent No.: US 11,875,765 B2
(45) Date of Patent: Jan. 16, 2024

(54) ELECTRONIC PERCUSSION INSTRUMENT AND HITTING DETECTION METHOD

(71) Applicant: Roland Corporation, Shizuoka (JP)

(72) Inventors: Keita Utsumi, Shizuoka (JP); Yutaka Morita, Shizuoka (JP); Ko Imai, Shizuoka (JP)

(73) Assignee: Roland Corporation, Shizuoka (JP)

( * ) Notice: Subject to any disclaimer, the term of this patent is extended or adjusted under 35 U.S.C. 154(b) by 162 days.

(21) Appl. No.: 17/109,154

(22) Filed: Dec. 2, 2020

(65) Prior Publication Data

US 2021/0201877 A1 Jul. 1, 2021

(30) Foreign Application Priority Data

Dec. 26, 2019 (JP) ................................ 2019-236184
Apr. 10, 2020 (JP) ................................ 2020-070810

(51) Int. Cl.
*G10H 3/14* (2006.01)
*G10H 1/32* (2006.01)

(52) U.S. Cl.
CPC .............. *G10H 3/146* (2013.01); *G10H 1/32* (2013.01); *G10H 2220/161* (2013.01); *G10H 2220/525* (2013.01)

(58) Field of Classification Search
CPC .... G10H 3/146; G10H 1/32; G10H 2220/161; G10H 2220/525
See application file for complete search history.

(56) References Cited

U.S. PATENT DOCUMENTS

| | | | | |
|---|---|---|---|---|
| 10,276,141 | B2 | 4/2019 | Takasaki | |
| 2005/0150366 | A1* | 7/2005 | Susami | G10H 3/146 84/735 |
| 2006/0219092 | A1 | 10/2006 | Mishima | |
| 2007/0234886 | A1* | 10/2007 | Matsuyuki | G10H 3/146 84/723 |
| 2013/0180388 | A1* | 7/2013 | Mori | G10H 3/14 84/723 |

(Continued)

FOREIGN PATENT DOCUMENTS

| | | |
|---|---|---|
| EP | 2846326 | 3/2015 |
| EP | 3291223 | 3/2018 |

(Continued)

OTHER PUBLICATIONS

"Office Action of Europe Counterpart Application", dated Jan. 26, 2022, p. 1-p. 7.

(Continued)

*Primary Examiner* — Jianchun Qin
(74) *Attorney, Agent, or Firm* — JCIPRNET

(57) ABSTRACT

An electronic percussion instrument and a hitting detection method are provided. The electronic percussion instrument includes: a head of which an upper surface is formed as a hitting surface; a body part, which is cylindrical and has an opening at an upper end side, the opening is covered by the head; and a plurality of head sensors provided on an inner peripheral side of the body part and detects a hitting on the hitting surface. The plurality of head sensors are in contact with a lower surface of the head in an area in which a distance from a center of the hitting surface is 50% or more and 75% or less of a radius of the hitting surface.

14 Claims, 6 Drawing Sheets

(56) References Cited

U.S. PATENT DOCUMENTS

2018/0061388 A1* 3/2018 Takasaki .................. G10H 1/32

FOREIGN PATENT DOCUMENTS

| | | |
|---|---|---|
| GB | 2170639 | 8/1986 |
| IT | BO20110173 | 10/2012 |
| JP | 2005037922 | 2/2005 |
| JP | 2018189809 | 11/2018 |

OTHER PUBLICATIONS

"Search Report of Europe Counterpart Application", dated May 14, 2021, p. 1-p. 10.

* cited by examiner

ELECTRONIC PERCUSSION INSTRUMENT AND HITTING DETECTION METHOD

CROSS-REFERENCE TO RELATED APPLICATION

This application claims the priority of Japan patent application serial no. 2019-236184, filed on Dec. 26, 2019 and serial no. 2020-070810, filed on Apr. 10, 2020. The entirety of each of the above-mentioned patent applications is hereby incorporated by reference herein and made a part of this specification.

BACKGROUND

Technical Field

The present disclosure relates to an electronic percussion instrument and particularly to an electronic percussion instrument and a hitting detection method capable of improving detection accuracy of a hitting position.

Description of Related Art

There is known an electronic percussion instrument which detects vibration generated when a head or rim is hit by a head sensor and a rim sensor and determines a hitting position on the basis of the detection result. For example, Patent Document 1 describes a technique of determining whether a head 101 or a rim (a first hitting part 107) has been hit by comparing an output value of a head sensor 133 with an output value of a rim sensor 122.

PATENT DOCUMENTS

[Patent Document 1] Japanese Patent Laid-Open No. 2018-189809 (for example, paragraphs 0047, 0048, 0056 to 0060, and FIG. 2).

However, in the above-described related art, since the plurality of head sensors is in contact with a back surface on the outer peripheral side of the head (a position close to the rim), vibration generated when hitting the rim is likely to be erroneously detected by the head sensor.

Thus, a problem arises in that the detection accuracy of the hitting position decreases.

SUMMARY

The disclosure provides an electronic percussion instrument and a hitting detection method.

According to one of the embodiments of the disclosure, an electronic percussion instrument of the disclosure includes: a head of which an upper surface is formed as a hitting surface; a body part, which is cylindrical and has an opening at an upper side, the opening is covered by the head; and a plurality of head sensors provided on an inner peripheral side of the body part and detects a hitting on the hitting surface, wherein the plurality of head sensors are in contact with a lower surface of the head in an area in which a distance from a center of the hitting surface is 50% or more and 75% or less of a radius of the hitting surface.

A hitting detection method of the disclosure is a hitting detection method of an electronic percussion instrument including a head of which an upper surface is formed as a hitting surface, a body part, which is cylindrical and has an opening at an upper end side, the opening is covered by the head, a frame which is fixed to an inner peripheral side of the body part and faces a lower surface of the head, a rim sensor which is supported by the frame and detects a hitting on an edge of the body part, and a plurality of head sensors which are in contact with the lower surface of the head while being supported by the frame and detect a hitting on the hitting surface, wherein a first determination unit is provided to determine a first playing style in which only an edge of the body part is hit and a second playing style in which the hitting surface and the edge of the body part are hit, the rim sensor is disposed at a center side of the frame, the plurality of head sensors are disposed closer to on an outer edge side of the frame than the rim sensor, and the first determination unit compares a ratio or a difference between an output value of the rim sensor and an output value of the head sensor with a first threshold value and determines the first playing style and the second playing style.

DESCRIPTION OF THE EMBODIMENTS

Figure 1:
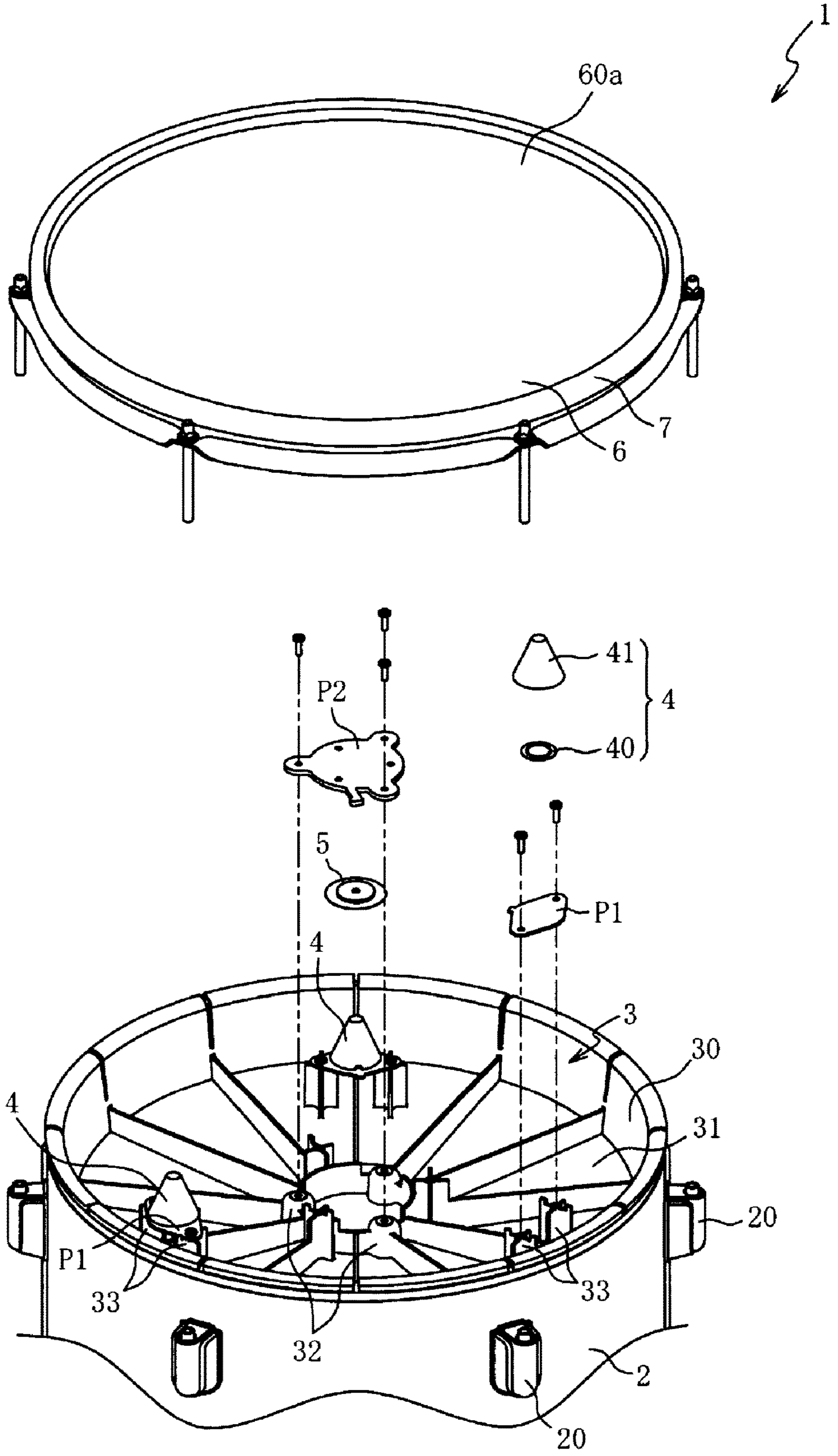
FIG. 1 is an exploded perspective view of an electronic drum of an embodiment.
Figure 2:
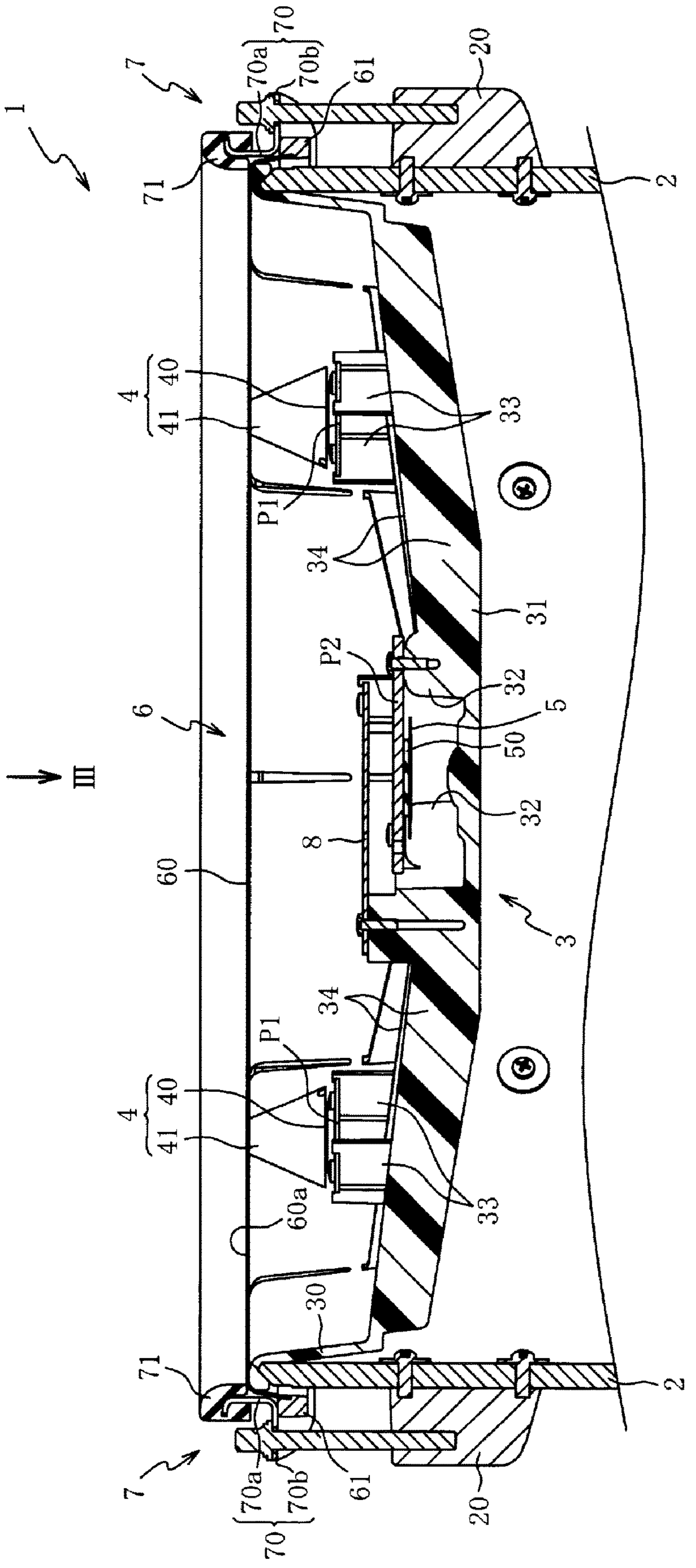
FIG. 2 is a cross-sectional view of the electronic drum.

Hereinafter, a preferred embodiment will be described with reference to the accompanying drawings. First, an overall configuration of an electronic drum 1 will be described with reference to FIGS. 1 and 2. FIG. 1 is an exploded perspective view of the electronic drum 1 of the embodiment and FIG. 2 is a cross-sectional view of the electronic drum 1. Additionally, in FIG. 1, a part of the electronic drum 1 (for example, a substrate 8 or the like shown in FIG. 2) is not shown in order to simplify the drawing. Further, FIG. 2 shows a cross-section cut by a plane along a shaft of the electronic drum 1.

As shown in FIG. 1, the electronic drum 1 is an electronic percussion instrument that imitates an acoustic drum. The electronic drum 1 includes a cylindrical shell 2 of which an upper end side (an end on the upper side of FIG. 1) opens and a resinous frame 3 is fixed to the inner peripheral side of the shell 2. The frame 3 includes a hanging part 30 which hangs downward from an edge of the opening of the shell 2 and a bottom part 31 which is connected to a lower end of the hanging part 30.

The hanging part 30 is formed in an annular shape (cylindrical shape) and the bottom part 31 having a disk shape is provided to close the lower end side of the hanging part 30. That is, the frame 3 is formed in a bowl shape that is recessed downward and a head sensor 4 and a rim sensor 5 are attached to a bottom surface of the frame 3 (an upper surface of the bottom part 31) through a first plate P1 and a second plate P2. The first plate P1 and the second plate P2 are plates which are formed by using a metal material or a resin material.

The rim sensor 5 is a disk-shaped piezoelectric element for detecting vibration when hitting an edge of the shell 2 (a rim 7) and the rim sensor 5 is stuck to a lower surface of the second plate P2. A plurality of (in this embodiment, three) first fixing parts 32 which protrude upward and have a columnar shape are provided on an upper surface of the bottom part 31 of the frame 3 and when the second plate P2 is fixed to the plurality of first fixing parts 32 by screws, the rim sensor 5 is supported by the frame 3 through the second plate P2.

The head sensor 4 includes a sensor unit 40 and a cushion 41 which is stuck to an upper surface of the sensor unit 40. The sensor unit 40 is a disk-shaped piezoelectric element and the cushion 41 is a truncated cone-shaped cushioning material formed by using an elastic material such as sponge, rubber, and thermoplastic elastomer.

The sensor unit 40 is stuck to an upper surface of the first plate P1. A pair of second fixing parts 33 having a cross-shaped cross-section protruding upward is provided on the upper surface of the bottom part 31 of the frame 3 and when the first plate P1 is fixed to the pair of second fixing parts 33 by screws, the head sensor 4 is supported by the frame 3 through the first plate P1.

When the pair of second fixing parts 33 are one set, three sets of the second fixing parts 33 are provided to be arranged in parallel in the circumferential direction of the frame 3. That is, a plurality of (in this embodiment, three) head sensors 4 are provided at equal pitches in the circumferential direction of the frame 3 and the vibration generated when hitting a head 6 is detected by the plurality of head sensors 4.

The head 6 includes a hitting surface 60*a* and an annular rim 7 which protrudes upward more than the hitting surface 60*a* is provided on the outer peripheral side of the hitting surface 60*a*. A plurality of fastening parts 20 protrude from an outer peripheral surface of the shell 2 in the radial direction and when the rim 7 is fixed to the plurality of fastening parts 20 by screws, the head 6 and the rim 7 are fixed to the shell 2.

As shown in FIG. 2, the head 6 includes a disk-shaped film part 60 of which an upper surface is formed as the hitting surface 60*a* and an annular frame part 61 which is connected to an outer frame part of the film part 60. The film part 60 is formed by using a mesh in which synthetic fibers are knitted or a film made of synthetic resin and the frame part 61 is formed by using a metal material or a resin material.

The rim 7 includes a rim part 70 which applies a tension to the head 6 and a rim cover 71 which covers the rim part 70. The rim part 70 includes a cylindrical annular part 70*a* and a flange part 70*b* which protrudes from a lower end side of the annular part 70*a* in a flange shape (outward in the radial direction) and is formed by using a metal material.

The rim cover 71 is fitted over the entire circumference of an upper end part of the annular part 70*a* and the rim cover 71 is formed by using an elastic material such as rubber. Thus, the rim cover 71 has a function of protecting the rim part 70 from the hitting of the rim 7.

The flange part 70*b* is a part which is fixed to the fastening part 20 of the shell 2 by a screw. Thus, when the flange part 70*b* is fixed to the fastening part 20 by a screw while the frame part 61 of the head 6 is disposed on the outer peripheral side of the shell 2 and the rim 7 (the rim part 70) is placed on the frame part 61, a tension is applied to the film part 60 of the head 6.

The frame 3 (the bottom part 31) supporting the head sensor 4 is disposed below the film part 60 to face the film part and the cushion 41 of the head sensor 4 is in contact with a lower surface of the film part 60 while a tension is applied to the film part 60. Thus, the vibration generated when hitting the hitting surface 60*a* of the film part 60 is transmitted to the sensor unit 40 through the cushion 41. Accordingly, the vibration generated when hitting the hitting surface 60*a* is detected by the plurality of head sensors 4.

Further, since the frame 3 supporting the rim sensor 5 is fixed to the inner peripheral side of the shell 2 to which the rim 7 is fixed, the vibration generated when hitting the rim 7 (the rim cover 71) is transmitted to the rim sensor 5 through the shell 2 and the frame 3 (the second plate P2) and the vibration is detected by the rim sensor 5.

An output signal based on the detection of the vibration of the head sensor 4 and the rim sensor 5 is output to the substrate 8. The positive electrodes of the sensor units 40 (the piezoelectric elements) of the plurality of head sensors 4 are connected to each other on the substrate 8 and the negative electrodes thereof are connected to each other on the substrate 8. That is, the sensor units 40 of the plurality of head sensors 4 are respectively connected in parallel to each other on the substrate 8 and output values of the plurality of head sensors 4 and an output value of the rim sensor 5 are output from the substrate 8 to an external control device 100 (see FIG. 5). In the control device 100, a hitting position is determined on the basis of a ratio between the output value of the head sensor 4 (the combined value of the output values of the plurality of head sensors 4) and the output value of the rim sensor 5.

Although it will be described in detail later, the control device 100 determines that a head-only shot for hitting only the head 6 has been played since the output value of the head sensor 4 is relatively large when the output ratio is relatively small if the output ratio is "output value of rim sensor 5/output value of head sensor 4". Further, the control device determines that a rim-only shot for hitting only the rim 7 has been played since the output value of the rim sensor 5 is relatively large when the output ratio is relatively large. On the other hand, the control device determines that a rim shot for hitting both the head 6 and the rim 7 (at the same time) has been played when the output ratio is medium.

In this case, when the vibration generated when hitting the head 6 is erroneously detected by the rim sensor 5 or the vibration generated when hitting the rim 7 is erroneously detected by the head sensor 4, musical tones that are inconsistent with the actual playing style of the performer are likely to be generated. In contrast, this embodiment has a configuration that improves the detection accuracy of the hitting position and can accurately generate musical tones for hitting. This configuration will be described with reference to FIGS. 2 and 3.

Figure 3:
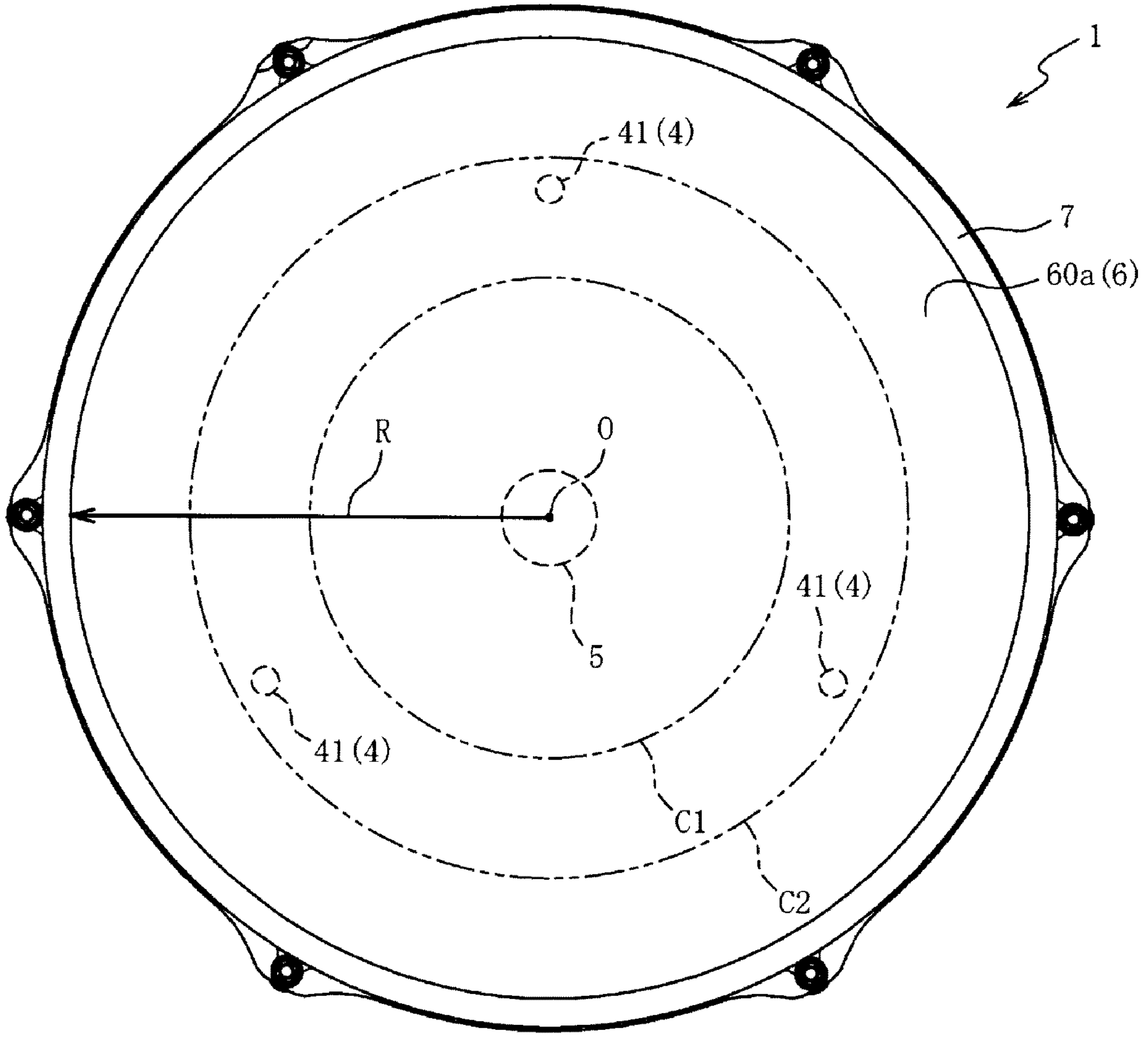
FIG. 3 is a plan view of the electronic drum when viewed from a direction of an arrow III of FIG. 2.

FIG. 3 is a plan view of the electronic drum 1 when viewed from a direction of an arrow III of FIG. 2. Additionally, in FIG. 3, the outer shape of the rim sensor 5 and the outer shape of the upper surface of the cushion 41 of the head sensor 4 are indicated by a dashed line. Further, when the radius R of the hitting surface 60*a* is the distance from the center O of the hitting surface 60*a* of the head 6 (the axis O of the shell 2) to the edge of the hitting surface 60*a* (the outer edge of the shell 2), a circle drawn with a radius of 50% of the radius R is shown as a virtual circle C1 and a circle drawn with a radius of 75% of the radius R is shown as a virtual circle C2. The centers of the virtual circles C1 and C2 are located at the center O of the hitting surface 60*a*.

As shown in FIG. 3, the cushions 41 of the plurality of head sensors 4 are in contact with a lower surface of the head 6 (a back side surface of the paper surface in the vertical direction of FIG. 3) outside the virtual circle C1. Accordingly, it is possible to suppress the detection sensitivity of the head sensor 4 from becoming higher in an area of a part of the hitting surface 60*a* and to improve the detection accuracy of the hitting position.

That is, for example, in a configuration in which the cushions 41 of the plurality of head sensors 4 contact the head 6 inside the virtual circle C1, the output value of the head sensor 4 when hitting the center O of the hitting surface 60*a* easily increases compared to a case in which the edge side of the hitting surface 60*a* is hit, so that the hitting sensitivity distribution on the hitting surface 60*a* becomes non-uniform. Thus, in some cases, it is determined that only the head 6 is hit even though the side of the center O of the hitting surface 60*a* and the rim 7 are hit at the same time or it is determined that only the rim 7 is hit even through the edge side of the hitting surface 60*a* and the rim 7 are hit at the same time.

Further, when the cushions 41 of the plurality of head sensors 4 contact the head 6 outside the virtual circle C2, the vibration generated when hitting the rim 7 is likely to be erroneously detected by the head sensor 4 since the head sensor 4 is disposed in the vicinity of the rim 7.

In contrast, in this embodiment, since the cushions 41 of the plurality of head sensors 4 contact the head 6 outside the virtual circle C1, the output value of the head sensor 4 can be uniform even when any position of the hitting surface 60*a* of the head 6 is hit. Further, since the cushions 41 of the plurality of head sensors 4 contact the head 6 inside the virtual circle C2, it is possible to suppress the vibration generated when hitting the rim 7 from being erroneously detected by the head sensor 4.

That is, it is possible to suppress the vibration generated when hitting the rim 7 from being erroneously detected by the head sensor 4 while allowing the hitting sensitivity distribution to be uniform in the hitting surface 60*a* by bringing the cushions 41 of the plurality of head sensors 4 into contact with the lower surface of the head 6 (the film part 60) in an area in which the distance from the center O of the hitting surface 60*a* is 50% or more and 75% or less of the radius R of the hitting surface 60*a*. Thus, since it is possible to improve the detection accuracy of the hitting position, it is possible to generate musical tones for hitting (the playing style of the performer) with high accuracy.

Additionally, in the description below, the "contact of the cushions 41 of the head sensors 4 with respect to the lower surface of the head 6 outside (inside) the virtual circle C1 (the virtual circle C2)" is described while being simply abbreviated as the "arrangement of the head sensors 4 outside (inside) the virtual circle C1 (the virtual circle C2)".

Here, since each of the head sensor 4 and the rim sensor 5 is supported by the common frame 3 (see FIG. 2), the vibration generated when hitting the head 6 is transmitted to the rim sensor 5 through the head sensor 4 and the frame 3 and the vibration is erroneously detected by the rim sensor 5 in some cases.

Thus, in this embodiment, the rim sensor 5 is disposed at the center side of the frame 3 (see FIG. 2) (a position overlapping the center O of the hitting surface in a plan view) and the plurality of head sensors 4 are disposed closer to the outer edge side of the frame 3 than the rim sensor 5. Accordingly, since the head sensor 4 and the rim sensor 5 can be disposed at a distant position, it is possible to suppress the vibration generated when hitting the head 6 from being transmitted to the rim sensor 5 through the head sensor 4. Thus, since it is possible to suppress the vibration from being erroneously detected by the rim sensor 5, it is possible to improve the detection accuracy of the hitting position.

Furthermore, when the rim sensor 5 is disposed on the center O of the hitting surface 60*a* (the center of the frame 3) and the head sensor 4 is disposed outside the virtual circle C1 and inside the virtual circle C2, it is possible to suppress the arrangement of the head sensors 4 from being too closer to the rim 7 while disposing the head sensors 4 at a position distant from the rim sensor 5. Thus, since it is possible to suppress the vibration generated when hitting the head 6 from being erroneously detected by the rim sensor 5 or to suppress the vibration generated when hitting the rim 7 from being erroneously detected by the head sensor 4, it is possible to improve the detection accuracy of the hitting position.

In this way, in order to improve the detection accuracy of the hitting position, it is important to make the sensitivity distribution of the sensor for the hitting uniform even when any part of the head 6 or the rim 7 is hit in addition to the suppressing of the erroneous detection of the vibration of the head sensor 4 or the rim sensor 5. In this case, for example, when the rim sensor 5 is disposed outside the virtual circle C2, a plurality of the rim sensors 5 need to be provided in the circumferential direction in order to make the sensitivity distribution uniform when the rim 7 is hit and thus the number of components increases.

In contrast, in this embodiment, as shown in FIG. 2, the edge of the frame 3 (the upper end part of the hanging part 30) is hooked on the edge of the opening of the shell 2 over the entire circumference in the circumferential direction and one rim sensor 5 is disposed at the center of the frame 3. Accordingly, it is possible to make the distance from the hitting position to the rim sensor 5 (the length of the vibration transmission path) uniform even when any position of the rim 7 in the circumferential direction is hit. Thus, since it is possible to make the sensitivity distribution for the hitting of the rim 7 uniform by one rim sensor 5, it is possible to improve the detection accuracy of the hitting position while decreasing the number of components.

On the other hand, since the vibration transmission path from the rim 7 to the rim sensor 5 increases when the rim sensor 5 is disposed at the center of the frame 3, the vibration generated when hitting the rim 7 is not easily transmitted to the rim sensor 5 compared to a case in which the rim sensor 5 is disposed outside the virtual circle C2. In contrast, for example, in a configuration in which the sensitivity of the rim sensor 5 itself is simply increased, the rim sensor 5 erroneously detects the vibration of the hitting surface 60*a* of the head 6 or an external sound (vibration).

In contrast, this embodiment employs a configuration in which the vibration generated when hitting the rim 7 is easily detected by the rim sensor 5 while such erroneous detection of the rim sensor 5 is suppressed. For example, as shown in FIG. 2, the plate thickness of the second plate P2 to which the rim sensor 5 is stuck is set to be 2 mm or more (in this embodiment, 3 mm) and is formed to be thicker than the first plate P1 having a general thickness (for example, 1 mm). That is, the rigidity of the second plate P2 is set to be higher than that of the plate generally used when supporting the sensor.

Accordingly, since it is possible to suppress the second plate P2 from being bent (the second plate P2 itself from being vibrated) due to the vibration propagated by air such as the vibration of the hitting surface 60*a* of the head 6 or the vibration of external sound, it is possible to suppress such vibration from being erroneously detected by the rim sensor 5. That is, although the output value of the rim sensor 5 generated when hitting the rim 7 slightly decreases since the second plate P2 is hard to bend, it is possible to stabilize the above-described output ratio (it is possible to suppress a variation in the output ratio due to the erroneous detection of the vibration) by suppressing the vibration of the hitting surface 60*a* of the head 6 or the vibration of the external sound from being erroneously detected by the rim sensor 5 and hence to improve the detection accuracy of the hitting position.

Further, since the second plate P2 to which the rim sensor 5 is attached is directly fixed to the frame 3 (the first fixing part 32) without using an elastic material (for example, rubber), it is possible to suppress the vibration generated when hitting the rim 7 from being attenuated due to the elastic member compared to a case in which the elastic member is provided between the second plate P2 and the frame 3. Thus, the vibration generated when hitting the rim 7 is easily transmitted to the rim sensor 5 through the frame 3 and the second plate P2.

Then, since the rim sensor 5 is stuck to the second plate P2 through a double-sided tape 50 having a cushion property (an elastic material), the rim sensor 5 itself is easily bent (easily vibrated) due to the vibration transmitted through the frame 3 and the second plate P2 when the rim 7 is hit. Accordingly, the vibration generated when hitting the rim 7 is easily detected by the rim sensor 5.

In this way, since the vibration generated when hitting the rim 7 is easily detected by the rim sensor 5 while suppressing the vibration other than the vibration generated when hitting the rim 7 from being erroneously detected by the rim sensor 5, it is possible to improve the detection accuracy of the hitting position.

Further, since the frame 3 is provided with a rib 34 which protrudes upward from a bottom surface thereof (an upper surface of the bottom part 31) and an area provided with the rib 34 easily becomes a vibration transmission path, in this embodiment, the first plate P1 to which the head sensor 4 is stuck is fixed to a position avoiding the rib 34 so that the vibration generated when hitting the rim 7 is not erroneously detected by the head sensor 4.

Specifically, the second fixing part 33 is formed to protrude upward more than the rib 34 and a pair of the second fixing parts 33 is formed with the rib 34 interposed therebetween. The first plate P1 is fixed to be bridged over the upper ends of the pair of second fixing parts 33 and the head sensor 4 is attached to the first plate P1. Accordingly, since it is possible to suppress the vibration transmitted to the rib 34 when hitting the rim 7 from being transmitted to the head sensor 4 through the second fixing part 33 and the first plate P1, it is possible to suppress such vibration from being erroneously detected by the head sensor 4.

Further, since it is possible to suppress the vibration generated when hitting the hitting surface 60*a* of the head 6 from being transmitted to the side of the rim sensor 5 through the head sensor 4, the first plate P1, the second fixing part 33, and the rib 34 by fixing the first plate P1 to a position avoiding the rib 34, it is possible to suppress such vibration from being erroneously detected by the rim sensor 5. Thus, it is possible to improve the detection accuracy of the hitting position.

Further, the end of the rib 34 on the inside in the radial direction is connected to the first fixing part 32 to which the second plate P2 is fixed and the end of the rib 34 on the outside in the radial direction is connected to the hanging part 30 of the frame 3. That is, since the rib 34 is provided to extend in the radial direction from the inner peripheral edge of the frame 3 to the fixed part of the second plate P2 and the frame 3, the vibration generated when hitting the rim 7 is easily transmitted to the rim sensor 5 through the hanging part 30, the rib 34, the first fixing part 32, and the second plate P2. Thus, since the vibration generated when hitting the rim 7 is easily detected by the rim sensor 5, it is possible to improve the detection accuracy of the hitting position.

Additionally, in this embodiment, twelve ribs 34 extending in the radial direction of the frame 3 are arranged in parallel in the circumferential direction (the plurality of ribs 34 is radially formed) and the rib 34 not connected to the first fixing part 32 also exists. However, the disclosure is not essentially limited thereto. For example, the rib 34 not connected to the first fixing part 32 may be omitted.

Next, a result of a hitting test performed for the head 6 and the rim 7 using the electronic drum 1 having the above-described configuration will be described with reference to FIG. 4. The hitting test was performed by using the electronic drum 1 of the above-described embodiment and an electronic drum of a comparative example in which the plurality of head sensors 4 is disposed outside the virtual circle C2. Additionally, the comparative example of the electronic drum has the same configuration as the electronic drum 1 except that the head sensor 4 is disposed outside the virtual circle C2.

In the hitting test, the output values of the head sensor 4 and the rim sensor 5 were compared with each other in the case of the head-only shot (the hitting of only the head 6), the rim shot (the hitting of both the head 6 and the rim 7), and the rim-only shot (the hitting of only the rim 7) in each of the electronic drum 1 and the electronic drum of the comparative example. FIG. 4(*a*) is a scatter plot showing a result of the hitting test of the electronic drum of the comparative example and FIG. 4(*b*) is a scatter plot showing a result of a hitting test of the electronic drum 1 of this embodiment. In FIG. 4, a vertical axis indicates the output value of the rim sensor 5 and a horizontal axis indicates the output value of the head sensor 4.

Figure 4A:
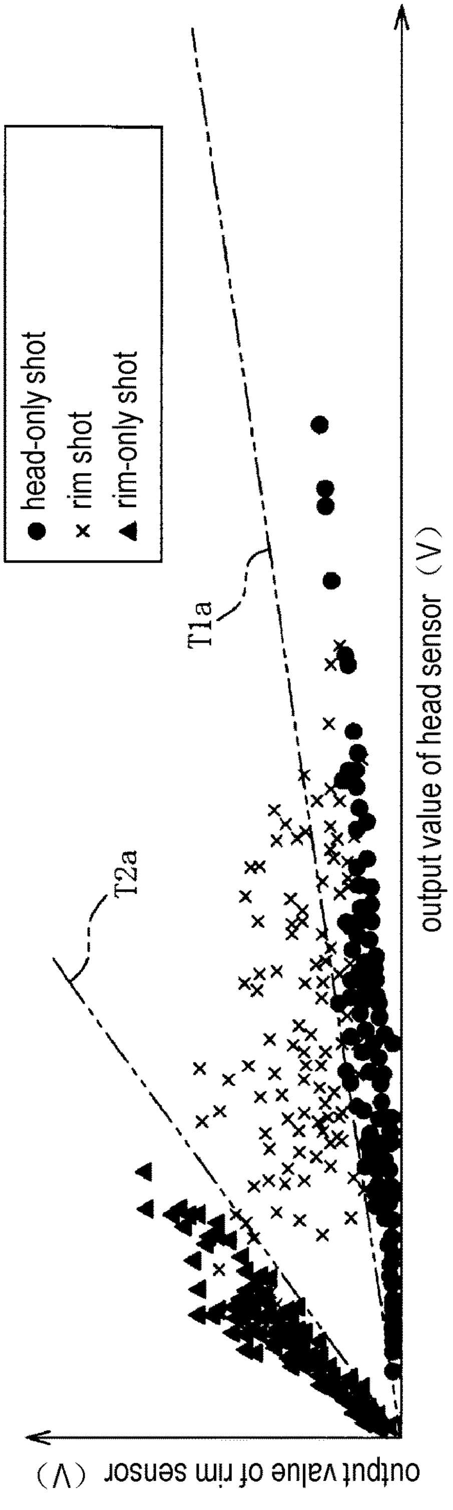
FIG. 4(*a*) is a scatter plot showing a result of a hitting test of an electronic drum of a comparative example and FIG. 4(*b*) is a scatter plot showing a hitting test result of the electronic drum of this embodiment.
Figure 4B:
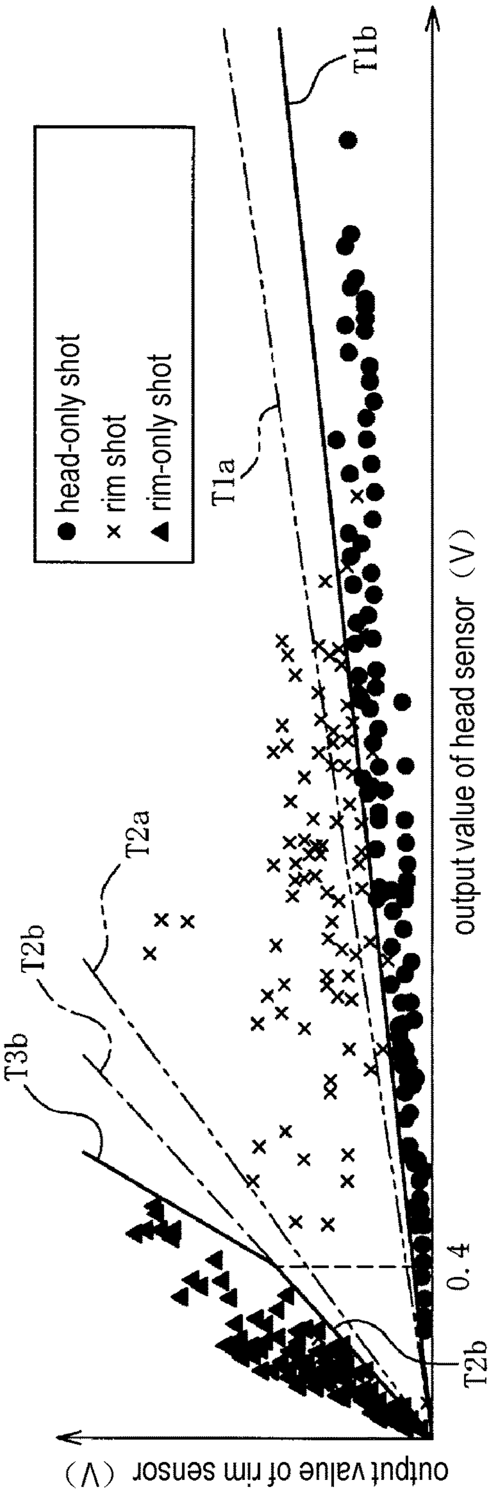

As shown in FIG. 4(*a*), the electronic drum of the comparative example has obtained a result that the distribution of the output ratio of "output value of rim sensor 5/output value of head sensor 4" when performing the rim shot tends to be biased downward (in a direction in which the output value of the head sensor 4 increases). It is considered that this is because the vibration generated when hitting the rim 7 is likely to be erroneously detected by the head sensor 4 in the electronic drum of the comparative example in which the head sensor 4 is disposed outside the virtual circle C2 (see FIG. 3).

Thus, in the electronic drum of the comparative example, the value of the threshold value T1*a* (the slope of the line T1*a*) for determining whether the head-only shot or the rim shot has been performed needs to be set relatively large. Thus, since it is often determined that the head-only shot has been performed even though the rim shot has been performed, the frequency with which musical tones are not generated according to the playing style of the performer increases.

On the other hand, as shown in FIG. 4(*b*), the electronic drum 1 of this embodiment has obtained a result that the distribution of the output ratio of "output value of rim sensor 5/output value of head sensor 4" when performing the rim shot is biased upward (in a direction in which the output value of the rim sensor 5 increases) compared to the electronic drum of the comparative example.

It is considered that this is because the vibration generated when hitting the rim 7 is not likely to be erroneously detected by the head sensor 4 in the electronic drum 1 of this embodiment in which the head sensor 4 is disposed inside the virtual circle C2 (see FIG. 3), that is, a position in which the distance from the center O of the hitting surface 60*a* is 75% or less of the radius R of the hitting surface 60*a*. Accordingly, the value of the threshold value T1*b* (the slope of the line T1*b*) for determining whether the head-only shot or the rim shot has been performed can be set to be smaller than the threshold value T1*a* of the electronic drum of the comparative example. Thus, since it is possible to determine a difference in the playing style between the head-only shot and the rim shot with high accuracy, it is possible to accurately generate musical tones according to the playing style of the performer.

Further, as shown in FIG. 4(*a*), the electronic drum of the comparative example has obtained a result that the distribution of the output ratio of "output value of rim sensor 5/output value of head sensor 4" when performing the rim-only shot tends to biased downward (in a direction in which the output value of the head sensor 4 increases). It is considered that this is because the hitting of the rim 7 is likely to be erroneously detected by the head sensor 4 in the electronic drum of the comparative example in which the head sensor 4 is disposed outside the virtual circle C2 (see FIG. 3).

Thus, in the electronic drum of the comparative example, the value of the threshold value T2*a* (the slope of the line T2*a*) for determining whether the rim-only shot or the rim shot has been performed needs to be relatively small. Thus, since it is often determined that the rim-only shot has been performed even though the rim shot has been performed, the frequency with which musical tones are not generated according to the playing style of the performer increases.

On the other hand, as shown in FIG. 4(*b*), the electronic drum 1 of this embodiment has obtained a result that the distribution of the output ratio of "output value of rim sensor 5/output value of head sensor 4" when performing the rim-only shot is biased upward (a direction in which the output value of the rim sensor 5 increases) compared to the electronic drum of the comparative example.

It is considered that this is because the hitting of the rim 7 is not likely to be erroneously detected by the head sensor 4 in the electronic drum 1 of this embodiment in which the head sensor 4 is disposed inside the virtual circle C2 (see FIG. 3), that is, a position in which the distance from the center O of the hitting surface 60*a* is 75% or less of the radius R of the hitting surface 60*a*. Accordingly, the values of the threshold values T2*b* and T3*b* (the slopes of the lines T2*b* and T3*b*) for determining whether the rim-only shot or the rim shot has been performed can be larger than the threshold value T2*a* of the electronic drum of the comparative example (the reason why two threshold values T2*b* and T3*b* are used will be described later). Thus, since it is possible to determine a difference in the playing style between the rim-only shot and the rim shot with high accuracy, it is possible to generate musical tones according to the playing style of the performer with high accuracy.

Additionally, although not shown in the drawings, when the head sensor 4 was disposed inside the virtual circle C1 (a position in which the distance from the center O of the hitting surface 60*a* is smaller than 50% of the radius R of the hitting surface 60*a*), a result has been obtained in which a variation easily occurs in the distribution of the output ratio of "output value of rim sensor 5/output value of head sensor 4" when performing the rim shot. It is considered that this is because the sensitivity distribution of the head sensor 4 easily becomes non-uniform or the hitting of the hitting surface 60*a* of the head 6 is likely to be erroneously detected by the rim sensor 5.

In contrast, the electronic drum 1 of this embodiment has obtained a result that the variation of the output ratio of "output value of rim sensor 5/output value of head sensor 4" when performing the head-only shot can be reduced. It is considered that this is because the hitting of the hitting surface 60*a* is not likely to be erroneously detected by the rim sensor 5 while the sensitivity distribution of the head sensor 4 becomes uniform by a configuration in which the head sensor 4 is disposed outside the virtual circle C1, that is, a position in which the distance from the center O of the hitting surface 60*a* is 50% or more of the radius R of the hitting surface 60*a*.

As described above, according to the electronic drum 1 of this embodiment, it is possible to suppress the vibration generated when hitting the rim 7 from being erroneously detected by the head sensor 4 while making the sensitivity distribution of the head sensor 4 uniform by disposing the head sensor 4 between the virtual circle C1 and the virtual circle C2. Further, since the rim sensor 5 is disposed at the center side of the frame 3 and the plurality of head sensors 4 are disposed closer to the outer edge side of the frame 3 than the rim sensor 5 (the head sensors 4 and the rim sensor 5 are disposed at a distant position), it is possible to suppress the vibration generated when hitting the hitting surface 60*a* of the head 6 from being erroneously detected by the rim sensor 5. Thus, since it is possible to improve the detection accuracy of the hitting position, it is possible to generate musical tones for hitting (the playing style of the performer) with high accuracy.

Figure 5:
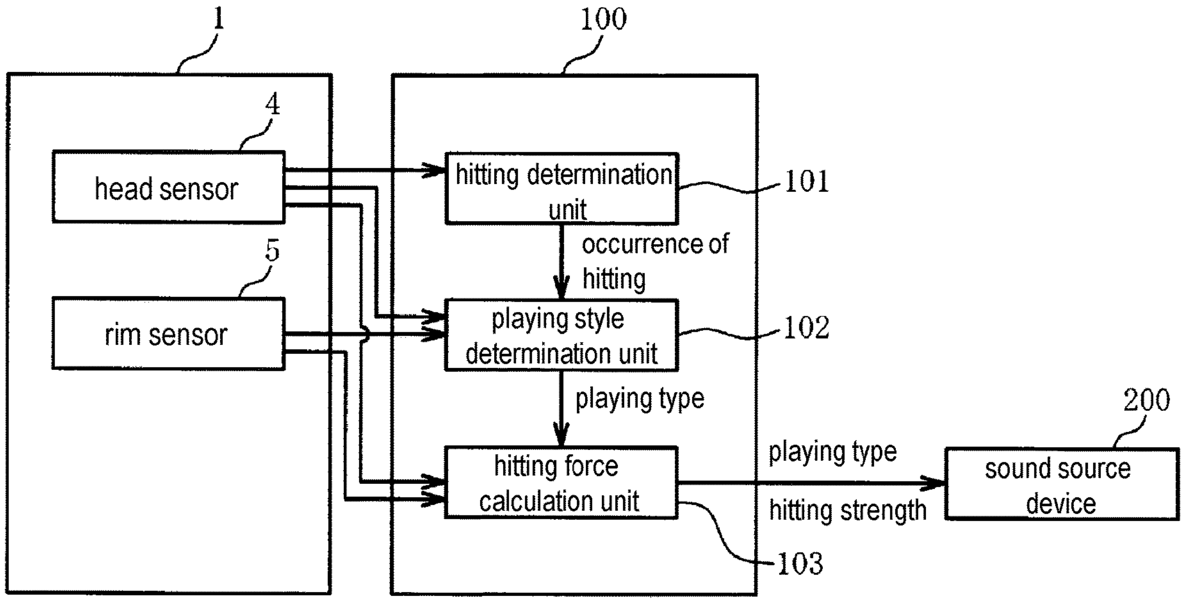
FIG. 5 is a functional block diagram schematically showing a process in an electronic drum and a control device.
Figure 6:
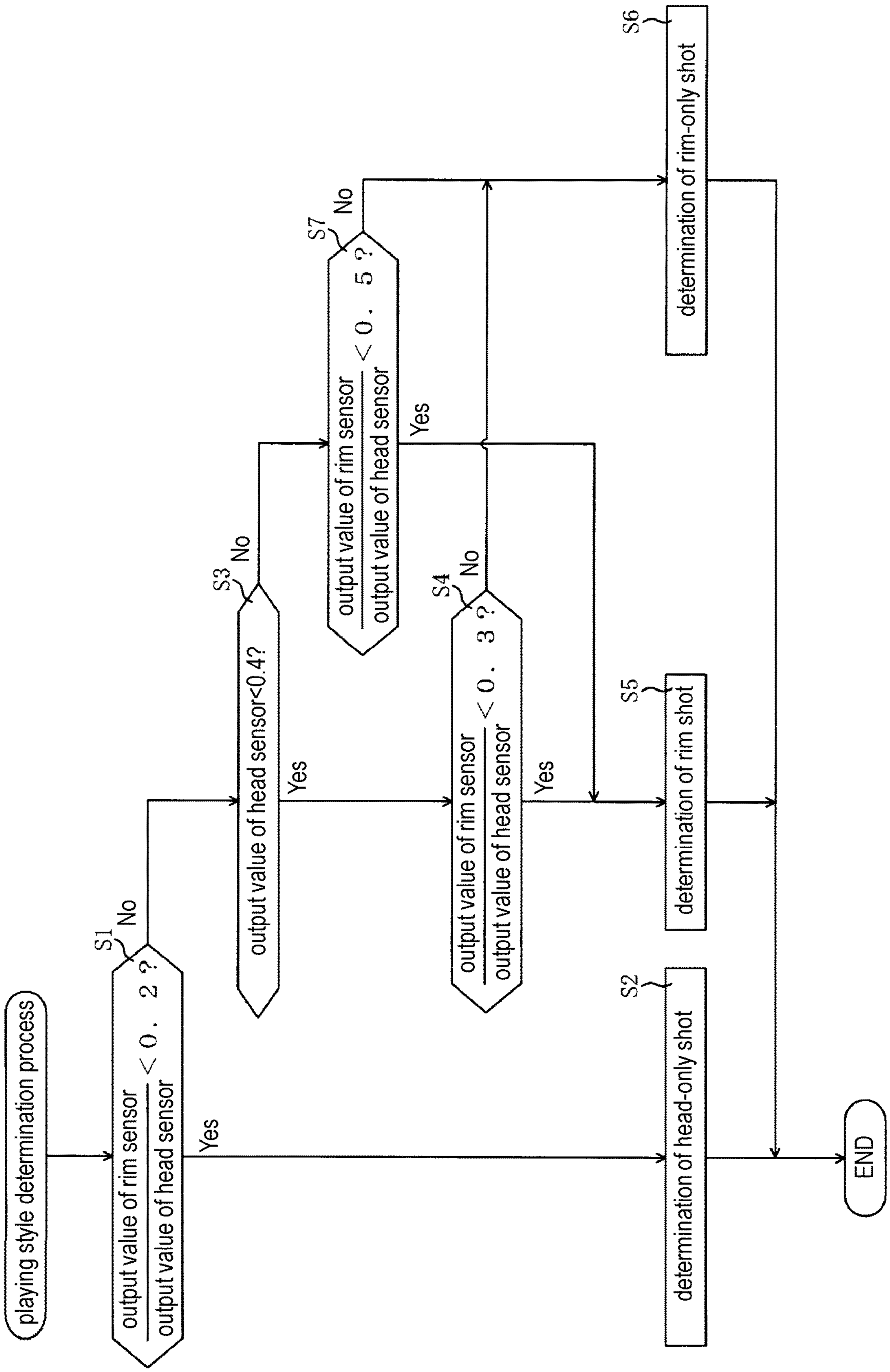
FIG. 6 is a flowchart showing a playing style determination process.

Next, a detailed hitting detection method using the electronic drum 1 and the control device 100 will be described with reference to FIGS. 5 and 6. FIG. 5 is a functional block diagram schematically showing a process (function) of the electronic drum 1 and the control device 100 and FIG. 6 is a flowchart showing a playing style determination process.

As shown in FIG. 5, the output values of the head sensor 4 and the rim sensor 5 of the electronic drum 1 are output to the external control device 100. The control device 100 is connected to the substrate 8 (see FIG. 2) and the control device 100 includes a hitting determination unit 101 which determines whether the hitting has been performed or not, a playing style determination unit 102 which determines a hitting position (playing style), and a hitting force calculation unit 103 which determines a hitting force. Each component of the hitting determination unit 101, the playing style determination unit 102, and the hitting force calculation unit 103 is controlled by a CPU (arithmetic unit) of the control device 100.

The output value of the head sensor 4 is output to the hitting determination unit 101. That is, the hitting determination unit 101 determines whether the head 6 and the rim 7 (see FIG. 2 for both) have been hit only on the basis of the output value of the head sensor 4. This reason will be described below.

As described above, the vibration generated when hitting the rim 7 is transmitted to the rim sensor 5 as much as possible and the output value of the rim sensor 5 becomes higher than that of the head sensor 4 when the rim 7 is hit. However, the variation of the output value when hitting the rim 7 becomes smaller in the head sensor 4 than in the rim sensor 5.

It is considered that this is because the rim sensor 5 is disposed at the center of the frame 3, the head sensor 4 is disposed on the outer edge side of the frame 3 (see FIG. 2), and the vibration transmission path from the rim 7 is shorter in the head sensor 4 than in the rim sensor 5 (the vibration is transmitted through a shorter member). That is, the absolute value of the output value when hitting the rim 7 becomes larger in the rim sensor 5, but the stability of the output value becomes higher in the head sensor 4 due to the configuration of the electronic drum 1.

Thus, as shown in FIG. 5, since the output value of the head sensor 4 is output to the hitting determination unit 101 and the determination on whether the head 6 and the rim 7 have been hit is performed only on the basis of the output value of the head sensor 4, it is possible to determine whether the hitting has been performed with high accuracy.

When the hitting determination unit 101 determines that the head 6 or the rim 7 has been hit (a predetermined output value or more is detected by the head sensor 4), a signal including information representing whether the hitting has been performed (the hitting information) is output from the hitting determination unit 101 to the playing style determination unit 102. Then, the playing style determination unit 102 determines the playing style of the hitting.

Additionally, in the description below, when the rim-only shot (first playing style), the rim shot (second playing style), and the head-only shot (third playing style) are described together, they will be described as "each playing style". In order to determine each playing style by the playing style determination unit 102, the output value of each of the head sensor 4 and the rim sensor 5 is output to the playing style determination unit 102. Here, a playing style determination process of the playing style determination unit 102 will be described with reference to FIG. 6.

As shown in FIG. 6, in the playing style determination process, first, when the output ratio is "output value of rim sensor 5/output value of head sensor 4", it is checked whether the output ratio is smaller than 0.2 (a predetermined threshold value) (S1). When the output ratio is smaller than 0.2 (S1: Yes), the output value of the head sensor 4 is relatively large and the possibility of hitting only the head 6 (see FIG. 2) is high. Accordingly, it is determined that the head-only shot has been performed (S2) and a series of processes end.

On the other hand, when the output ratio of "output value of rim sensor 5/output value of head sensor 4" is 0.2 or more (S1: No), the output value of the rim sensor 5 is relatively large and the possibility of also hitting the rim 7 is high. In this case, it is necessary to determine which of the rim-only shot and the rim shot has been performed as a playing style, but in this embodiment, the determination can be made with high accuracy.

This configuration will be described with reference to FIG. 4(*b*). As shown in FIG. 4(*b*), it is found that the distribution of the output value when performing the head-only shot has a small spread in the vertical axis direction and is unlikely to vary. It is considered that this is because the head sensor 4 directly contacts the film part 60 of the head 6 (see FIG. 2) and the output value of the head sensor 4 when hitting the head 6 is stable.

Thus, even when the threshold value T1*b* (in this embodiment, 0.2) for determining the head-only shot and the rim shot is one constant, the determination can be performed with relatively high accuracy. Further, since the threshold value T1*b* is one constant, the processing time for determining the head-only shot and the rim shot can be shortened compared to, for example, a case in which the threshold value T1*b* is a variable or a plurality of constants. Thus, since the time from the hit to the sound can be shortened, the performer can have a natural playing feeling.

On the other hand, it is found that the distribution of the output value when performing the rim-only shot has a relatively large spread in the horizontal axis direction (variations are likely to occur). More specifically, when the rim-only shot is strongly performed so that the output value of the rim sensor 5 is large, the output ratio of "output value of rim sensor 5/output value of head sensor 4" is likely to increase. In contrast, when the rim-only shot is weakly performed so that the output value of the rim sensor 5 is small, the output ratio of "output value of rim sensor 5/output value of head sensor 4" easily decreases compared to the case of the strong shot.

It is considered that this is because the output value of the rim sensor 5 particularly easily decreases compared to the case of the strong shot when the rim-only shot is weakly performed since the vibration transmission path from the rim 7 to the rim sensor 5 is relatively long. In this case, when the determination of the rim-only shot and the rim shot is performed by using only the threshold value T2*b* (in this embodiment, 0.3) (see a one-dotted chain line of FIG. 4(*b*)), it is likely to be erroneously determined that this shot is the rim-only shot when performing the rim shot in which the output ratio of "output value of rim sensor 5/output value of head sensor 4" is relatively large.

In contrast, in this embodiment, the determination is performed by using the threshold value T2*b* (in this embodiment, 0.3) when the output value of the head sensor 4 is smaller than 0.4 V (a predetermined value) and the determination is performed by using the threshold value T3*b* (in this embodiment, 0.5) larger than the threshold value T2*b* when the output value of the head sensor 4 is 0.4 V or more when determining the rim-only shot and the rim shot. Accordingly, it is not likely to be erroneously determined that this shot is the rim-only shot when performing the rim shot in which the output ratio of "output value of rim sensor 5/output value of head sensor 4" is relatively large. Thus, it is possible to determine the rim-only shot and the rim shot with high accuracy.

A description will be made by returning to FIG. 6. As shown in FIG. 6, when the output ratio of "output value of rim sensor 5/output value of head sensor 4" is 0.2 or more (S1: No), it is checked whether the output value of the head sensor 4 is smaller than 0.4(V) (S3). The process of S3 is to determine the rim-only shot and the rim shot by using two threshold values depending on whether the output value of the head sensor 4 is smaller than 0.4(V) as described above.

When the output value of the head sensor 4 is smaller than 0.4(V) (S3: Yes), it is checked whether the output ratio of "output value of rim sensor 5/output value of head sensor 4" is smaller than 0.3 (the first value) (S4). When the output ratio is smaller than 0.3 (S4: Yes), it is determined that the rim shot has been performed (S5) and a series of processes end.

On the other hand, when the output ratio of "output value of rim sensor 5/output value of head sensor 4" is 0.3 (the first value) or more (S4: No), it is determined that the rim-only shot has been performed (S6) and a series of processes end.

In the process of S3, when the output value of the head sensor 4 is 0.4(V) or more (S3: No), it is checked whether the output ratio of "output value of rim sensor 5/output value of head sensor 4" is smaller than 0.5 (the second value) (S7). When the output ratio is smaller than 0.5 (S7: Yes), it is determined that the rim shot has been performed (S5) and a series of processes end.

On the other hand, when the output ratio of "output value of rim sensor 5/output value of head sensor 4" is 0.5 (the second value) or more (S7: No), it is determined that the rim-only shot has been performed (S6) and a series of processes end.

In this way, in the playing style determination process of this embodiment, since a different threshold value is used (a threshold value is changed) in response to the magnitude of the output value of the head sensor 4 when determining the rim-only shot and the rim shot, it is possible to determine the rim-only shot and the rim shot with high accuracy.

Here, as in this embodiment, in order to change the threshold value in response to the output value of the head sensor 4, for example, the threshold value can be set to a variable (the threshold value is increased as the output value of the head sensor 4 increases). However, in such a configuration, since the processing time for determining the rim-only shot and the rim shot becomes long, a delay time is likely to occur from the hit to the sound.

In contrast, according to the playing style determination process of this embodiment, since the threshold value for determining the rim-only shot and the rim shot is two constants, the processing time for determining the rim-only shot and the rim shot can be shortened compared to a case in which such a threshold value is a variable or a constant of 3 or more. Thus, since the time from the hit to the sound can be shortened, the performer can have a natural playing feeling.

After the playing style determination process is performed by the playing style determination unit 102, as shown in FIG. 5, a signal including information on the type of playing style is output from the playing style determination unit 102 to the hitting force calculation unit 103 and the hitting force of each playing style is calculated in the hitting force calculation unit 103. In the hitting force calculation unit 103, the hitting force of the head-only shot is calculated on the basis of the output value of the head sensor 4 output to the hitting force calculation unit 103. As described above, since the output value of the head sensor 4 is easily stabilized compared to the rim sensor 5, it is possible to calculate the hitting force of the head-only shot with high accuracy by calculating the hitting force only using the output value of the head sensor 4.

On the other hand, in the hitting force calculation unit 103, the hitting forces of the rim-only shot and the rim shot are calculated on the basis of the output value of the head sensor 4 and the output value of the rim sensor 5 output to the hitting force calculation unit 103. Since the hitting force is calculated by using each of the output value of the head sensor 4 whose output value is easy to stabilize and the output value of the rim sensor 5 indicating the hitting strength of the rim 7, it is possible to calculate the hitting forces of the rim-only shot and the rim shot with high accuracy.

Then, a signal including information on the hitting force calculated by the hitting force calculation unit 103 and the type of playing style determined in the playing style determination unit 102 is output to an external sound source device 200. In the sound source device 200, a musical tone signal is generated on the basis of the determination result of the control device 100 and the musical tone signal is output from the sound source device 200 to an amplifier and a speaker (both not shown). Accordingly, an electronic musical tone according to each playing style is emitted from the speaker.

In this way, in this embodiment, the hitting forces of the rim-only shot and the rim shot are calculated on the basis of the output values of the head sensor 4 and the rim sensor 5. In the case of this configuration, the hitting forces of the rim-only shot and the rim shot can be calculated by using, for example, the average value of the output value of the head sensor 4 and the output value of the rim sensor 5 "(output value of head sensor 4+output value of rim sensor 5)/2". However, in such a calculation method, the performer cannot have a natural playing feeling.

That is, even when the rim-only shot (the rim shot) and the head-only shot are performed at the same hitting force, the output value of the rim sensor 5 when performing the rim-only shot is smaller than the output value of the head sensor 4 when performing the head-only shot. Therefore, when the hitting force of the rim-only shot (the rim shot) is calculated by using the average value of the output value of the head sensor 4 and the output value of the rim sensor 5, the hitting force in the rim-only shot (the rim shot) is calculated to be smaller than that of the head-only shot although the playing is performed at the same force. Thus, an (appropriate) electronic musical tone according to the actual hitting force cannot be emitted from the speaker when the rim-only shot (the rim shot) is performed.

In contrast, in this embodiment, when the playing style determination unit 102 determines that the head-only shot has been performed, the hitting force is calculated by directly using the output value of the head sensor 4 (without amplification) in the hitting force calculation unit 103. On the other hand, when the playing style determination unit 102 determines that the rim-only shot (the rim shot) has been performed, the hitting force is calculated by using the average value of the output value of the head sensor 4 and the output value of the rim sensor 5 amplified by a predetermined amount (for example, three times) "(output value of head sensor 4+output value of rim sensor 5×3)/2" in the hitting force calculation unit 103.

Since a signal including information on the amplified hitting force (the hitting strength) is output to the sound source device 200 in this way, a musical tone signal output from the sound source device 200 to the amplifier or the speaker similarly becomes an amplified musical tone signal when performing the rim-only shot (the rim shot). Thus, since an (appropriate) electronic musical tone according to the actual hitting force of each playing style can be emitted from the speaker, the performer can have a natural playing feeling.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

In the above-described embodiment, a case has been described in which the head sensor 4 is disposed outside the virtual circle C1 or inside the virtual circle C2, but the disclosure is not limited thereto. For example, the head sensor 4 may be disposed inside the virtual circle C1 or outside the virtual circle C2.

In the above-described embodiment, a case has been described in which one rim sensor 5 is disposed at the center of the frame 3 (the center O of the hitting surface 60*a*), but the disclosure is not limited thereto. For example, one or more rim sensors 5 may be disposed on the outer edge side of the frame 3 (for example, the outside of the virtual circle C1).

In the above-described embodiment, a case has been described in which the outer peripheral side edge of the frame 3 is hooked on the edge of the opening of the shell 2, but the disclosure is not limited thereto. For example, the outer peripheral side edge of the frame 3 may be fixed to the inner peripheral surface of the shell 2. That is, at least a part of the frame 3 may be connected to the shell 2 and the method of fixing the frame 3 to the shell 2 is not limited to the above-described embodiment.

In the above-described embodiment, a case has been described in which the head sensor 4 and the rim sensor 5 are supported by the frame 3 through the first plate P1 and the second plate P2, but the disclosure is not limited thereto. For example, the head sensor 4 or the rim sensor 5 may be directly supported by the frame 3 (the hanging part 30 or the bottom part 31) without using the first plate P1 and the second plate P2. In this case, the first fixing part 32 or the second fixing part 33 may be omitted.

In the above-described embodiment, a case has been described in which the rim sensor 5 is supported by the frame 3 through the second plate P2 having higher rigidity than the first plate P1 supporting the head sensor 4, but the disclosure is not limited thereto. The rigidity of the second plate P2 supporting the rim sensor 5 may be set to be the same as (or lower than) the rigidity of the first plate P1 supporting the head sensor 4.

In the above-described embodiment, a case has been described in which the plate thickness of the second plate P2 supporting the rim sensor 5 is thickened to increase the rigidity, but the disclosure is not limited thereto. For example, the rigidity of the second plate P2 may be larger than that the first plate P1 by changing the material of the plate or increasing the number of the plates.

In the above-described embodiment, a case has been described in which the second plate P2 supporting the rim sensor 5 is fixed to the frame 3 without using the elastic member, but the disclosure is not limited thereto. For example, the second plate P2 supporting the rim sensor 5 may be fixed to the frame 3 through an elastic member (rubber or the double-sided tape having a cushion property).

In the above-described embodiment, a case has been described in which the rim sensor 5 is supported by the second plate P2 through the double-sided tape 50 having a cushion property (an elastic material), but the disclosure is not limited thereto. For example, if the rim sensor 5 can be elastically supported, an elastic material (for example, rubber) other than the double-sided tape 50 may be used.

In the above-described embodiment, a case has been described in which the rib 34 protruding upward from the bottom surface of the frame 3 is provided to extend in the radial direction of the frame 3, but the disclosure is not limited thereto. For example, the formation direction of the rib 34 can be appropriately set and the rib 34 may be omitted.

In the above-described embodiment, a case has been described in which the first plate P1 supporting the head sensor 4 is fixed to the frame 3 at a position avoiding the rib 34, but the disclosure is not limited thereto. For example, the first plate P1 may be fixed onto the rib 34 (a part corresponding to the second fixing part 33 is provided at a position overlapping the rib 34).

In the above-described embodiment, a case in which the inner radial end of the rib 34 is connected to the first fixing part 32 for fixing the rim sensor 5 has been described, but the disclosure is not limited thereto. For example, the rib 34 and the first fixing part 32 may not contact each other.

In the above-described embodiment, a case has been described in which a determination is performed by using the threshold value T2*b* (the first value) when the output value of the head sensor 4 is smaller than 0.4 V (a predetermined value) and a determination is performed by using the threshold value T3*b* (the second value) larger than the threshold value T2*b* when the output value of the head sensor 4 is 0.4 V or more when determining the rim-only shot and the rim shot, but the disclosure is not limited thereto. For example, when determining the rim-only shot and the rim shot, a variable (a value proportional to the output value of the head sensor 4) or a constant of 3 or more may be used as the threshold value. In any configuration, the threshold value may increase as the output value of the head sensor 4 increases.

Further, the threshold value may not be changed on the basis of the output value of the head sensor 4. For example, when determining the rim-only shot and the rim shot, the determination may be performed by using the threshold value T2*b* when the output value of the rim sensor 5 is smaller than 0.4 V (a predetermined value) and the determination may be performed by using the threshold value T3*b* when the output value is 0.4 V or more (a predetermined value or more).

In the above-described embodiment, a case has been described in which each playing type is determined on the basis of the ratio of the output value of the head sensor 4 (the combined value of the output values of the plurality of head sensors 4) and the output value of the rim sensor 5, but the disclosure is not limited thereto. For example, each playing style may be determined on the basis of the difference between the output value of the head sensor 4 (the combined value of the output values of the plurality of head sensors 4) and the output value of the rim sensor 5 or a unit for determining each playing style (a configuration corresponding to the control device 100) may be provided in the substrate 8.

Further, for example, each playing style may be determined on the basis of the ratio of "output value of head sensor 4/output value of rim sensor 5" or the difference of "output value of head sensor 4−output value of rim sensor 5". When determining the rim-only shot and the rim shot with such a configuration, the threshold value may be a variable or the threshold value may be a constant of 2 or more so that the threshold value decreases as the output value of the head sensor 4 increases. Accordingly, it is possible to determine the rim-only shot and the rim shot with high accuracy.

In the above-described embodiment, a case has been described in which the output values of the head sensor 4 and the rim sensor 5 are used when calculating the hitting force of the rim-only shot (the rim shot) by the hitting force calculation unit 103, but the disclosure is not limited thereto. For example, the hitting force of the rim-only shot (the rim shot) may be calculated by using only the output value of the head sensor 4 or only the output value of the rim sensor 5.

In the above-described embodiment, a case has been described in which the hitting force is calculated by directly using the output value of the head sensor 4 (without amplification) when performing the head-only shot, but the disclosure is not limited thereto. For example, when the head-only shot is performed, the output value of the head sensor 4 may be amplified by a predetermined amount to calculate the hitting force.

Further, in the above-described embodiment, a case has been described in which the hitting force is calculated by using the average value of the output value of the head sensor 4 and the amplified output value of the rim sensor 5 when the rim-only shot (the rim shot) is performed, but the disclosure is not essentially limited thereto. For example, when the rim-only shot (the rim shot) is performed, the hitting force may be calculated by using the average value of the output value of the head sensor 4 and the output value of the rim sensor 5 (without amplifying the output value of the rim sensor 5) and a musical tone signal amplified by a predetermined amount on the basis of the calculated hitting force may be generated by the sound source device 200.

That is, if the configuration is such that an electronic musical tone corresponding to the actual hitting force in each playing style can be emitted from the speaker, it is possible to appropriately set how much the output value of the head sensor 4 or the rim sensor 5 in each playing style should be amplified (how to weight and correct) or when the signal should be amplified (which component to amplify the signal).

What is claimed is:

1. An electronic percussion instrument comprising:

a head of which an upper surface is formed as a hitting surface;

a body part, which is cylindrical and has an opening at an upper end side of the body part, the opening is covered by the head;

a frame which is fixed to an inner peripheral side of the body part and faces a lower surface of the head;

a rim sensor which is supported by the frame and detects a hitting on an edge of the body part; and a plurality of head sensors which are in contact with the lower surface of the head while being supported by the frame and detect a hitting on the hitting surface, wherein the rim sensor is disposed at a center on the frame, wherein the plurality of head sensors are disposed closer to an outer of the frame than the rim sensor and inner than an edge of the frame, and wherein the frame comprises a rib which protrudes upward from a bottom surface of the frame and extends in a radial direction of the frame, and a pair of fixing parts which is separated from the rib and protrudes upward more than the rib from the bottom surface of the frame, and wherein the head sensors are supported by the frame through a first plate fixed to be bridged over an upper ends of the pair of the fixing parts such that the first plate avoids the rib.

2. The electronic percussion instrument according to claim 1, wherein the rim sensor is supported by the frame through a second plate having a plate thickness of 2 mm or more.

3. The electronic percussion instrument according to claim 2, wherein the second plate is fixed to the frame without using an elastic member.

4. The electronic percussion instrument according to claim 2, wherein the rim sensor is supported by the second plate through an elastic member.

5. The electronic percussion instrument according to claim 2, wherein the frame comprises an other fixing part which protrudes upward from the bottom surface of the frame and to which the second plate is fixed, and wherein an inner radial end of the rib is connected to the other fixing part.

6. The electronic percussion instrument according to claim 1, wherein an outer peripheral side edge of the frame is hooked on an edge of the opening of the body part.

7. A hitting detection method of an electronic percussion instrument, wherein the electronic percussion instrument comprises:

a head of which an upper surface is formed as a hitting surface;

a body part, which is cylindrical and has an opening at an upper end side of the body part, the opening is covered by the head;

a frame which is fixed to an inner peripheral side of the body part and faces a lower surface of the head;

a rim sensor which is supported by the frame and detects a hitting on an edge of the body part; and a plurality of head sensors which are in contact with the lower surface of the head while being supported by the frame and detect a hitting on the hitting surface, wherein the rim sensor is disposed at a center on the frame, wherein the plurality of head sensors are disposed closer to an outer of the frame than the rim sensor and inner than an edge of the frame, and wherein the frame comprises a rib which protrudes upward from a bottom surface of the frame and extends in a radial direction of the frame, and a pair of fixing parts which is separated from the rib and protrudes upward more than the rib from the bottom surface of the frame, wherein the head sensors are supported by the frame through a first plate fixed to be bridged over an upper ends of the pair of the fixing parts such that the first plate avoids the rib, the hitting detection method comprising:

detecting a hitting on the hitting surface on a basis of output values of the plurality of head sensors.

8. A hitting detection method of an electronic percussion instrument, wherein the electronic percussion instrument comprises:

a head of which an upper surface is formed as a hitting surface;

a body part, which is cylindrical and has an opening at an upper end side of the body part, the opening is covered by the head;

a frame which is fixed to an inner peripheral side of the body part and faces a lower surface of the head;

a rim sensor which is supported by the frame and detects a hitting on an edge of the body part; and a plurality of head sensors which are in contact with the lower surface of the head while being supported by the frame and detect a hitting on the hitting surface, wherein the rim sensor is disposed at a center on the frame, wherein the plurality of head sensors are disposed closer to an outer of the frame than the rim sensor and inner than an edge of the frame, and wherein the frame comprises a rib which protrudes upward from a bottom surface of the frame and extends in a radial direction of the frame, and a pair of fixing parts which is separated from the rib and protrudes upward more than the rib from the bottom surface of the frame, wherein the head sensors are supported by the frame through a first plate fixed to be bridged over an upper ends of the pair of the fixing parts, such that the first plate avoids the rib, the hitting detection method comprising:

a first determination step of comparing a ratio or a difference between an output value of the rim sensor and output values of the head sensors with a first threshold value to determine a first playing style in which only an edge of the body part is hit and a second playing style in which the hitting surface and the edge of the body part are hit.

9. The hitting detection method according to claim 8, wherein in the first determination step, the ratio or the difference between the output value of the rim sensor and the output values of the head sensors is compared with a second threshold value to determine the second playing style and a third playing style in which only the hitting surface is hit.

10. The hitting detection method according to claim 8, wherein the first threshold value is a value different in response to a magnitude of the output values of the head sensors or the output value of the rim sensor.

11. The hitting detection method according to claim 10, wherein the first threshold value includes two constants which are a first value used when the output values of the head sensors or the output value of the rim sensor is smaller than a predetermined value and a second value used when the output values of the head sensors or the output value of the rim sensor is the predetermined value or more.

12. The hitting detection method according to claim 8, further comprising:

a second determination step of determining whether a hitting has been performed in accordance with the first playing style and the second playing style on a basis of the output values of the head sensors.

13. The hitting detection method according to claim 8, further comprising:

a third determination step of determining a hitting force of the first playing style or the second playing style on a basis of the output values of the head sensors and the output value of the rim sensor.

14. The hitting detection method according to claim 13, comprising outputting a musical tone signal based on the hitting force determined in the third determination step, wherein the third determination step further determines a hitting force of the third playing style in which only the hitting surface is hit on a basis of the output values of the head sensors, and wherein when the first playing style or the second playing style is performed, the hitting force determined in the third determination step is amplified and output.

* * * * *